(12) United States Patent
Gill

(10) Patent No.: US 7,538,989 B2
(45) Date of Patent: May 26, 2009

(54) TUNNEL MR HEAD FORMED WITH PARTIAL MILLED STACK

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 429 days.

(21) Appl. No.: 11/354,553

(22) Filed: Feb. 14, 2006

(65) Prior Publication Data

US 2007/0188941 A1 Aug. 16, 2007

(51) Int. Cl.
*G11B 5/39* (2006.01)

(52) U.S. Cl. ............................. 360/324.2; 360/324.12

(58) Field of Classification Search ............... 360/324.2, 360/324.12
See application file for complete search history.

(56) References Cited

U.S. PATENT DOCUMENTS

| | | | |
|---|---|---|---|
| 6,341,053 B1 | 1/2002 | Nakada et al. | 360/324.2 |
| 6,466,419 B1 | 10/2002 | Mao | 360/324.1 |
| 6,617,055 B2 | 9/2003 | Gill | 428/692 |
| 6,674,617 B2 | 1/2004 | Gill | 360/324.12 |
| 6,741,433 B1 | 5/2004 | Nishioka | 360/324.2 |
| 6,795,280 B1 | 9/2004 | Song et al. | 360/324.2 |
| 6,807,034 B2 | 10/2004 | Hasegawa | 360/314 |
| 6,852,550 B2 | 2/2005 | Tuttle et al. | 438/3 |
| 6,888,705 B2 * | 5/2005 | Fontana et al. | 360/324.12 |
| 6,893,740 B2 | 5/2005 | Saito | 428/668 |
| 7,369,375 B2 * | 5/2008 | Hayashi et al. | 360/324.12 |
| 2003/0197987 A1 | 10/2003 | Saito | 360/324.12 |
| 2003/0231436 A1 | 12/2003 | Nishiyama | 360/324.1 |
| 2003/0231437 A1 | 12/2003 | Childress et al. | 360/324.12 |
| 2004/0061979 A1 * | 4/2004 | Ho et al. | 360/321 |
| 2004/0106012 A1 | 6/2004 | Hasegawa | 428/811.5 |
| 2004/0114284 A1 | 6/2004 | Rachid et al. | 360/324.11 |
| 2004/0214353 A1 | 10/2004 | Nishiyama et al. | 438/3 |
| 2004/0223267 A1 | 11/2004 | Childress et al. | 360/324.2 |
| 2004/0228045 A1 | 11/2004 | Hasegawa et al. | 360/324.1 |
| 2005/0002131 A1 | 1/2005 | Gill | 360/324.12 |

(Continued)

FOREIGN PATENT DOCUMENTS

JP 2003298150 10/2003
JP 2004179250 6/2004

OTHER PUBLICATIONS

Yoshiyuki Fukumoto, Atsushi Kamijo; "Effect of Milling Depth of the Junction Pattern on Magnetic Properties and Yields in Magnetic Tunnel Junctions", Jpn. J. Appl. Phys. vol. 41, pp. L183-L185, Feb. 15, 2002.

(Continued)

*Primary Examiner*—Jefferson Evans
(74) *Attorney, Agent, or Firm*—John L. Rogitz

(57) ABSTRACT

In a magnetic tunnel junction (MTJ) device having a pinned layer and upper and lower free sublayers, to avoid loss in tunnel magnetoresistance, etching or milling of the free sublayer materials is stopped in the lower free sublayer. The upper free sublayer may be softer and thicker than the lower free sublayer to promote this, and may be doped to reduce its magnetization while maintaining physical thickness. The lower free sublayer can be made of CoFe and the upper free sublayer can made of NiFe and a dopant such as Mo or Rh.

12 Claims, 3 Drawing Sheets

U.S. PATENT DOCUMENTS

| | | | |
|---|---|---|---|
| 2005/0013061 A1 | 1/2005 | Gill | 360/324.11 |
| 2007/0171570 A1* | 7/2007 | Gill | 360/110 |
| 2007/0188939 A1* | 8/2007 | Beach et al. | 360/324.2 |
| 2007/0188940 A1* | 8/2007 | Beach et al. | 360/324.2 |
| 2007/0188942 A1* | 8/2007 | Beach et al. | 360/324.2 |

OTHER PUBLICATIONS

Y. Jiang, S. Abe, T. Nozaki, N. Tezuka, K. Inomata, "Influence of Synthetic Antiferromagnet Free Layer on Current-Perpendicular-to-Plane Spin-Valves", IEEE Transactions on Magnetic, vol. 40, No. 4, Jul. 2004, pp. 2245-2247.

* cited by examiner

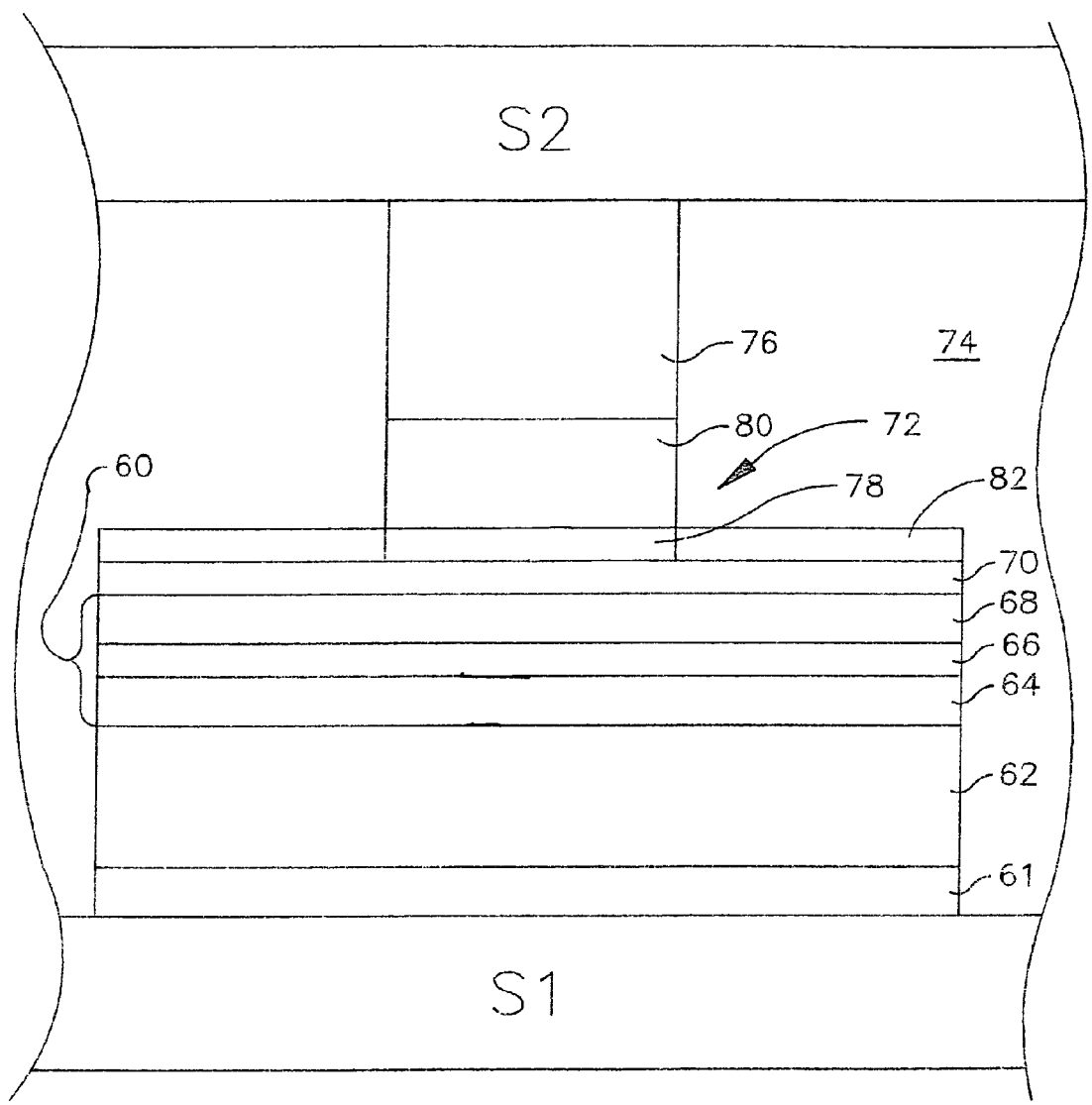

TUNNEL MR HEAD FORMED WITH PARTIAL MILLED STACK

FIELD OF THE INVENTION

The present invention generally relates to magnetoresistive devices, such as magnetic tunnel junction (MTJ) devices for, e.g., disk drive read heads.

BACKGROUND OF THE INVENTION

In magnetic disk drives, data is written and read by magnetic transducers called "heads." The magnetic disks are rotated at high speeds, producing a thin layer of air called an air bearing surface (ABS). The read and write heads are supported over the rotating disk by the ABS, where they either induce or detect flux on the magnetic disk, thereby either writing or reading data. Layered thin film structures are typically used in the manufacture of read and write heads. In write heads, thin film structures provide high areal density, which is the amount of data stored per unit of disk surface area, and in read heads they provide high resolution.

The present invention is directed generally to devices that can be used, in some implementations, as heads for disk drives, and more particularly the present invention is directed to magnetic tunnel junction (MTJ) devices. An MTJ device has at least two metallic ferromagnetic layers separated by a very thin nonmagnetic insulating tunnel barrier layer, wherein the tunneling current perpendicularly through the layers depends on the relative orientation of the magnetizations in the two ferromagnetic layers. The high magnetoresistance at room temperature and generally low magnetic switching fields of the MTJ renders it effective for use in magnetic sensors, such as a read head in a magnetic recording disk drive, and nonvolatile memory elements or cells for magnetic random access memory (MRAM).

In a MTJ device, one of the ferromagnetic layers has its magnetization fixed, such as by being pinned by exchange coupling with an adjacent antiferromagnetic layer, and the field of the other ferromagnetic layer is "free" to rotate in the presence of an applied magnetic field in the range of interest of the read head or memory cell.

To increase both sensitivity and output, the free layer, which may be composed of one or more sub-layers, may be direct coupled to an antiferromagnetic layer. To make such a device, the free layer is established on the barrier that overlays the above-mentioned pinned stack, and then is configured by protecting only the area of the free layer sought to be maintained and ion milling the remainder away, down to the barrier covering the pinned stack.

As critically recognized herein, during the above process the barrier might be unintentionally eroded because it is difficult to stop removing material exactly as the last of the free layer intended to be removed is indeed milled away. This results in a deleterious loss of tunnel magnetotresistance between the free and pinned stacks from shunting caused by a breakdown in the barrier and/or by redeposited material.

The present invention makes the additional critical observations. As understood herein, it is necessary for stabilization purposes to provide stabilization structure in MTJ devices, and one way to do this is to surround the free stack with a hard bias material. The present invention recognizes that for optimum stabilization, when so doing the hard bias layer ideally is centered around the free stack.

With these recognitions in mind, the invention herein is provided.

SUMMARY OF THE INVENTION

A magnetic tunnel junction device has a pinned ferromagnetic layer with its magnetization direction substantially prevented from rotation in the presence of an applied magnetic field. The device also includes an insulating tunnel barrier layer on the pinned layer and a free ferromagnetic stack on the tunnel barrier layer with its magnetization direction substantially free to rotate in the presence of an applied magnetic field. The free stack includes a lower free ferromagnetic sublayer on the barrier layer and an upper free ferromagnetic sublayer on the lower free ferromagnetic sublayer. The upper free sublayer can be made of a thicker and softer material than the lower free ferromagnetic sublayer. A skirt extends away from the stack against the barrier and is integral to the lower free ferromagnetic sublayer. Thus, it is of the same material as the lower free ferromagnetic sublayer, or is an oxide thereof.

A hard bias material may be deposited over the skirt and surrounding and centered on the stack. The lower free ferromagnetic sublayer may be made of CoFe and the upper free ferromagnetic sublayer can be made of NiFe and a dopant such as Mo or Rh.

In another aspect, a magnetic tunnel junction device includes a ferromagnetic layer having a magnetization pinned from rotation and upper and lower ferromagnetic sublayers against each other and not having their magnetizations pinned from rotation. The lower sublayer includes a skirt extending radially beyond the upper sublayer. A barrier layer is between the lower sublayer and ferromagnetic layer.

In yet another aspect, a method for making a MTJ device includes forming a barrier layer on a pinned stack, and forming a lower free ferromagnetic sublayer on the barrier layer. The method also includes forming an upper free ferromagnetic sublayer on the lower free ferromagnetic sublayer. According to present principles, the method contemplates etching or milling completely through the upper free ferromagnetic sublayer and but not completely through the lower free ferromagnetic sublayer, then stopping the etching or milling process to thereby establish a skirt on the lower free ferromagnetic sublayer that extends radially beyond the upper free ferromagnetic sublayer.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is an elevational view of a first embodiment of a non-limiting MTJ device made in accordance with the present invention;

DETAILED DESCRIPTION OF THE PREFERRED EMBODIMENT

Figure 1:
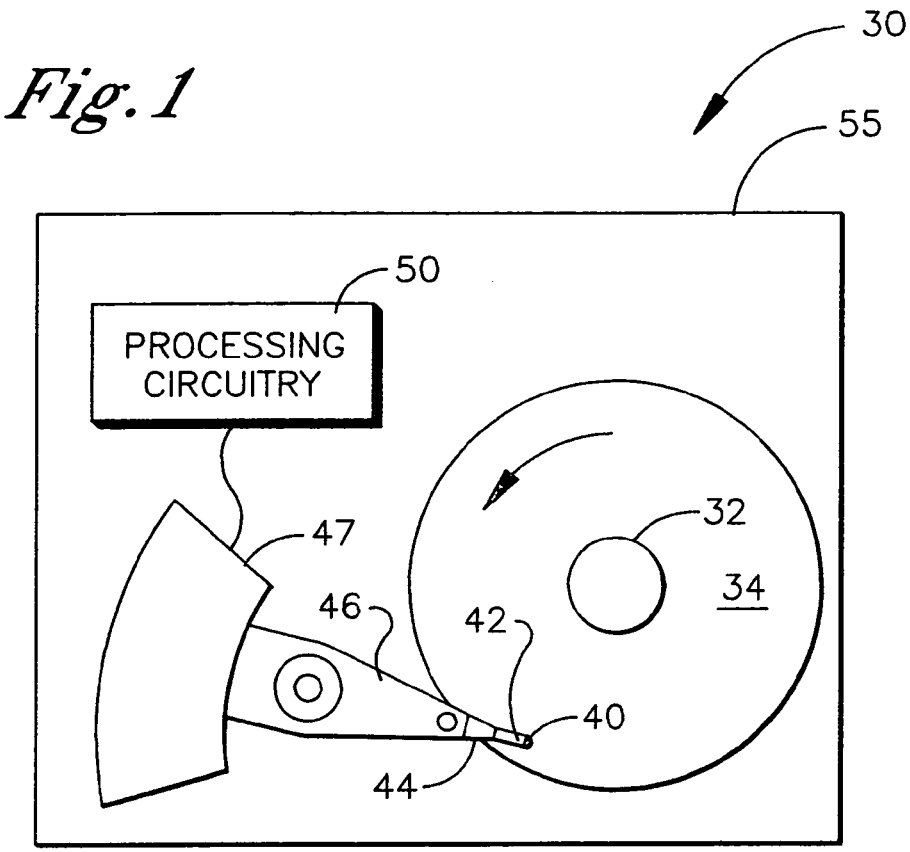
FIG. 1 is a schematic plan view of a hard disk drive, showing one non-limiting environment for the present invention.

Referring initially to FIG. 1, a magnetic disk drive 30 includes a spindle 32 that supports and rotates a magnetic disk 34. The spindle 32 is rotated by a spindle motor that is controlled by a motor controller which may be implemented in the electronics of the drive. A slider 42 has a combined read and write magnetic head 40 and is supported by a suspension 44 and actuator arm 46 that is rotatably positioned by an actuator 47. The head 40 may be a GMR or MR head or other magnetoresistive head. It is to be understood that a plurality of disks, sliders and suspensions may be employed. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin cushion of air known as the air bearing that exists between the surface of the disk 34 and an air bearing surface (ABS) of the head. The magnetic head 40 may then be employed for writing information to multiple circular tracks on the surface of the disk 34, as well as for reading information therefrom. To this end, processing circuitry 50 exchanges signals, representing such information, with the head 40, provides spindle motor drive signals for rotating the magnetic disk 34, and provides control signals to the actuator for moving the slider to various tracks. The components described above may be mounted on a housing 55.

Now referring to FIG. 2, the head 40 which is manufactured using the process of the present invention includes a pinned stack 60, it being understood that the pinned stack 60 may be formed on a substrate such as but not limited to a lower shield layer S1. In non-limiting implementations the pinned stack 60 may be formed on a seed layer 61 such as a bi-layer seed layer made of Ta/Ru or NiFeCr or Cu that is on the substrate and that in turn is covered by an antiferromagnetic sublayer 62 which may be made of IrMnCr, without limitation.

In the non-limiting embodiment shown, a first pinned ferromagnetic sublayer 64 that may be made of, e.g., CoFe25 is formed on the antiferromagnetic sublayer 62. Above the first pinned ferromagnetic sublayer 64 is a template sublayer 66 and on top of that a second pinned ferromagnetic sublayer 68, with the template sublayer 66 being made of, e.g., Ru or Cr or Ir and with the second pinned ferromagnetic sublayer 68 being made of CoFeB, in non-limiting embodiments. The ferromagnetic sublayers 64, 68 are called "pinned" because their magnetization direction is prevented from rotation in the presence of applied magnetic fields in the desired range of interest for the MTJ device. Without limitation, the sublayers 64, 66, 68 respectively may be, e.g., forty Angstroms thick/ 4.5 Angstroms thick/forty Angstroms thick.

Other CoFe and NiFe alloys may be used for the ferromagnetic sublayers and other antiferromagnetic materials may include NiMn and IrMn. The substrate may be a silicon wafer if, for instance, the device is a memory cell, and ordinarily would be the bottom electrically conductive lead located on either the alumina gap material or the magnetic shield material on the trailing surface of the head carrier if the device is a read head.

Formed on the pinned stack 60 is a barrier layer 70 that is made of an insulating tunnel barrier material. By way of non-limiting example, the barrier layer 70 may be five to fifteen Angstroms thick and may and may be made by depositing Aluminum on the pinned stack 60 and then oxidizing it to create an $Al_2O_3$ insulating tunnel barrier layer 70. While $Al_2O_3$ may be used, a wide range of other materials may be used, including MgO, AlN, aluminum oxynitride, oxides and nitrides of gallium and indium, and bilayers and trilayers of such materials.

A free ferromagnetic stack, generally designated 72, is formed on the barrier layer 70 as shown. The free stack 72 is surrounded by an insulating layer and then a hard bias layer, collectively designated 74. The insulating material may be, e.g., $Al_2O_3$. The free stack 72 may be covered by a protective cap 76. The cap 76 in turn may be topped by a shield S2 in accordance with principles known in the art.

In accordance with present principles, the free stack 72 includes, from the barrier layer 70, a lower free ferromagnetic sublayer 78 that may be made of CoFe and an upper free ferromagnetic sublayer 80. The sublayers 78, 80 are stabilized by the hard bias layer. By "free" is meant that the magnetization direction of the free stack 72 is not pinned by exchange coupling, and is thus free to rotate in the presence of applied magnetic fields in the range of interest.

The upper free ferromagnetic sublayer 80 may be made of a material that can be doped to reduce its magnetization, thereby permitting use of a physically thicker free layer without a concomitant increase in magnetization. In one embodiment the upper free ferromagnetic sublayer 80 is made of NiFe, doped with, e.g., Mo or Rh. For example, the upper free ferromagnetic sublayer 80 may be $\{Ni_{90}Fe_{10}\}_{94}Mo_6$.

As shown in FIG. 2, after the manufacturing process described below, a skirt portion 82 of the lower free sublayer 78 extends radially away from the free stack 72 after etching. In contrast, after etching/milling no portions of the upper free sublayer 80 extend beyond the vertical edge of the free stack 72 as shown. In any case, the skirt is integral to the lower free sublayer and is of the same material as the lower free sublayer, or, as set forth further below, may be an oxide thereof.

In one non-limiting implementation, the upper free ferromagnetic sublayer 80 maybe relatively thick (e.g., up to forty Angstroms), to render easier the stopping of the etch/mill process before completely removing the skirt 82, because the effective magnetic thickness may be made as small as desired by appropriately doping the upper free sublayer 80. Other thicknesses can be used. The lower free ferromagnetic layer 78 may be ten Angstroms thick.

The hard bias and insulating layers thus are deposited both around the free stack 72 and on top of the skirt 82. Further, the hard bias material is substantially centered on the free stack 72 as shown.

Figure 3:
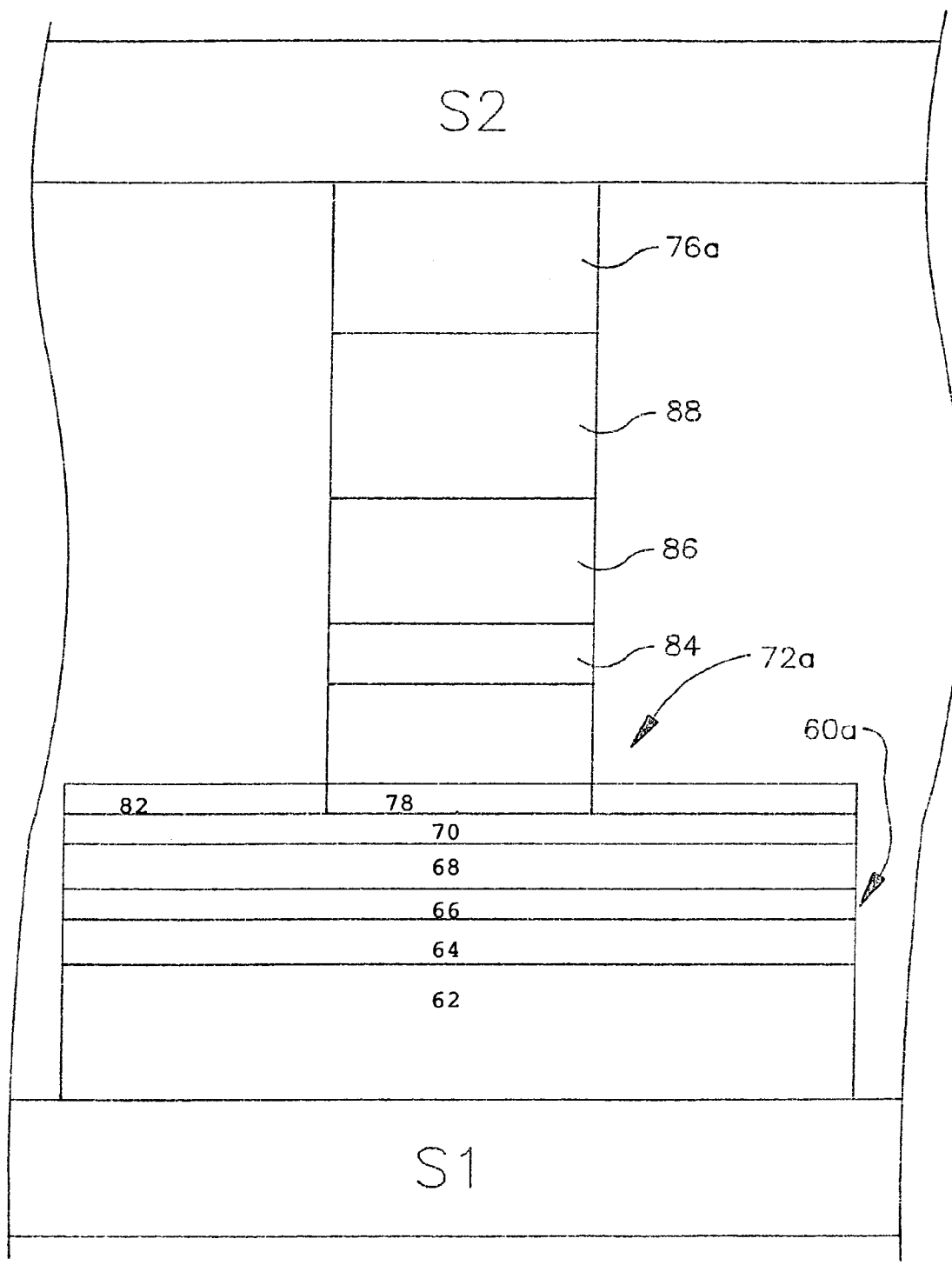
FIG. 3 is an elevational view of a second embodiment of a non-limiting MTJ device made in accordance with the present invention.

FIG. 3 shows a device that is in all essential respects identical to that shown in FIG. 2, i.e., FIG. 3 shows a free stack 72a over a pinned stack 60a separated from each other by a barrier, and a cap 76a over the free stack 72a, with the following exceptions. Between the free stack 72a and the cap 76a, starting from the free stack 72a, is a spacer layer 84, a hard bias layer 86 made of appropriate hard bias material, and an antiferromagnetic layer 88. In one non-limiting implementation, the antiferromagnetic layer 88 is made of PtMn, as can the layer 62. Other materials, such as NiMn, may be used.

Figure 4:
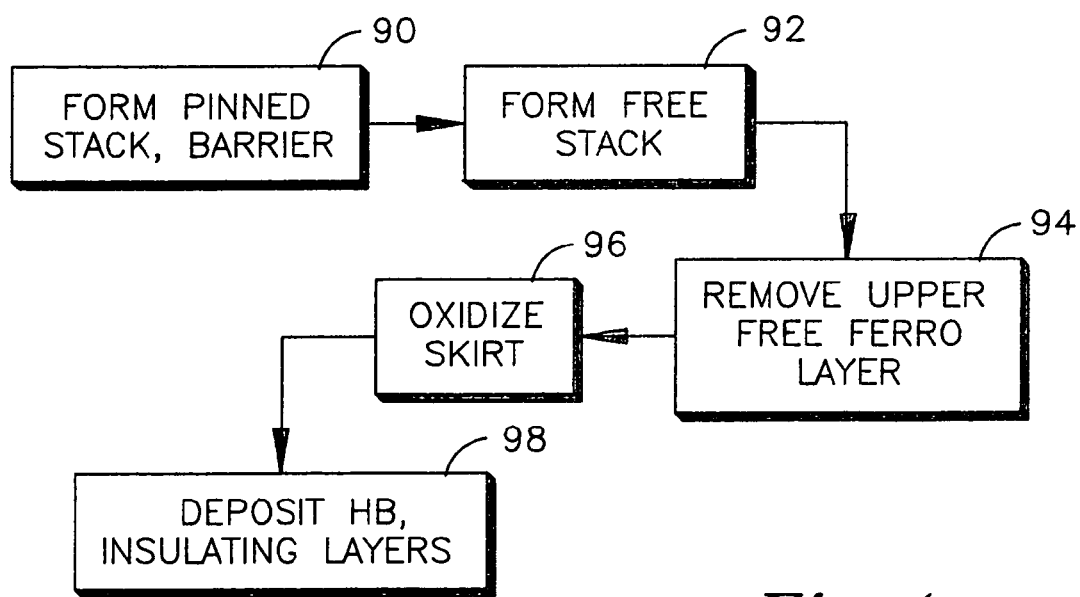
FIG. 4 is a flow chart of the method for making the device shown in FIG. 2.

Now referring to FIG. 4, at block 90 the pinned stack 60 and barrier 70 are formed on a substrate in accordance with principles known in the art, e.g., by sputtering. Proceeding to block 92, lower and upper free ferromagnetic sublayers 78, 80 are formed, likewise by sputtering or other deposition technique. Then, at block 94 the entire portions of the upper free ferromagnetic sublayer 80 outside the free stack 72, are removed by etching (e.g., reactive ion etching) or milling (e.g., ion milling) to leave the skirt 82 of the lower free sublayer 78 as shown. This is facilitated because the relatively thicker upper free sublayer 80 is softer and more easily removed than the lower free sublayer 78, making it easier to stop prior to unintentionally milling or etching all the way to the barrier. Because the upper free sublayer 80 is doped, its greater physical thickness, which promotes controlled stoppage of milling or etching, does not result in undesirably high magnetization. However, because the lower free ferromagnetic sublayer 78 is retained, adequate magnetoresistance of the device is achieved.

In non-limiting embodiments a combination of 10/50 degree ion-milling may be used for the above process, essentially defining the track edge and self-cleaning process.

The skirt 82 may be oxidized at block 96 and then the insulating and hard bias materials are formed at block 98, with the hard bias material substantially centered on the free stack 72 as shown.

While the particular TUNNEL MR HEAD FORMED WITH PARTIAL MILLED STACK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A magnetic tunnel junction device comprising:
   a pinned ferromagnetic layer having a magnetization direction substantially prevented from rotation in the presence of an applied magnetic field;
   an insulating tunnel barrier layer on the pinned layer; and
   a free ferromagnetic stack on the tunnel barrier layer and having a magnetization direction substantially free to rotate in the presence of an applied magnetic field, the stack comprising:
      a lower free ferromagnetic sublayer on the barrier layer; and
      an upper free ferromagnetic sublayer on the lower free ferromagnetic sublayer, the upper free sublayer being made of a thicker and softer material than the lower free ferromagnetic sublayer; and
   a skirt extending away from the stack against the barrier, the skirt being integral to the lower free ferromagnetic sublayer and being the same material as the lower free ferromagnetic sublayer, or an oxide thereof.

2. The device of claim 1, comprising a hard bias material over the skirt and surrounding the stack, the hard bias material being substantially centered on the free stack.

3. The device of claim 1, wherein the lower free ferromagnetic sublayer is made of CoFe and the upper free ferromagnetic sublayer is made of NiFe and a dopant 4. The device of claim 3, wherein the dopant is Mo or Rh.

5. The device of claim 1, wherein no portions of the upper free ferromagnetic sublayer extend beyond vertical edges of the free stack.

6. The device of claim 1, comprising a hard disk drive engaged with the MTJ device.

7. A magnetic tunnel junction device comprising:
   at least one ferromagnetic layer having a magnetic field pinned from rotation;
   at least upper and lower ferromagnetic sublayers against each other and not having their magnetic fields pinned from rotation, the lower sublayer including a skirt extending laterally beyond the upper sublayer, the lower sublayer being disposed between the upper sublayer and the ferromagnetic layer having a magnetic field pinned from rotation;
   at least one barrier layer between the lower sublayer and ferromagnetic layer; and
   a hard bias material over the skirt and substantially centered at least on the upper sublayer.

8. The device of claim 7, further comprising a hard disk drive engaged with the MTJ device.

9. A magnetic tunnel junction device comprising:
   at least one ferromagnetic layer having a magnetic field pinned from rotation;
   at least upper and lower ferromagnetic sublayers against each other and not having their magnetic fields pinned from rotation, the lower sublayer including a skirt extending laterally beyond the upper sublayer; and
   at least one barrier layer between the lower sublayer and ferromagnetic layer, wherein the lower ferromagnetic sublayer is made of CoFe and the upper ferromagnetic sublayer is made of NiFe and a dopant.

10. The device of claim 9, wherein the dopant is Mo or Rh.

11. A magnetic tunnel junction device comprising:
    at least one ferromagnetic layer having a magnetic field pinned from rotation;
    at least upper and lower ferromagnetic sublayers against each other and not having their magnetic fields pinned from rotation, the lower sublayer including a skirt extending laterally beyond the upper sublayer, the lower sublayer being disposed between the upper sublayer and the ferromagnetic layer having a magnetic field pinned from rotation; and
    at least one barrier layer between the lower sublayer and ferromagnetic layer, wherein the lower ferromagnetic sublayer is harder than the upper ferromagnetic sublayer.

12. A magnetic tunnel junction device comprising:
    at least one ferromagnetic layer having a magnetic field pinned from rotation;
    at least upper and lower ferromagnetic sublayers against each other and not having their magnetic fields pinned from rotation, the lower sublayer including a skirt extending laterally beyond the upper sublayer, the lower sublayer being disposed between the upper sublayer and the ferromagnetic layer having a magnetic field pinned from rotation; and
    at least one barrier layer between the lower sublayer and ferromagnetic layer, wherein the lower ferromagnetic sublayer is thinner than the upper ferromagnetic sublayer.

* * * * *